US012764024B2

(12) United States Patent
Elluru et al.

(10) Patent No.: US 12,764,024 B2
(45) Date of Patent: Oct. 13, 2026

(54) IDENTIFYING NETWORK DEVICE UPLINKS

(71) Applicant: Hewlett Packard Enterprise Development LP, Spring, TX (US)

(72) Inventors: Krishna Mohan Elluru, Bangalore (IN); Suresh Rukmangathan, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 52 days.

(21) Appl. No.: 18/641,665

(22) Filed: Apr. 22, 2024

(65) Prior Publication Data

US 2025/0254094 A1 Aug. 7, 2025

(30) Foreign Application Priority Data

Feb. 1, 2024 (IN) ............................. 202441006882

(51) Int. Cl.

| | |
|---|---|
| ***H04L 41/12*** | (2022.01) |
| ***H04L 43/0852*** | (2022.01) |
| ***H04L 43/0876*** | (2022.01) |
| ***H04L 43/10*** | (2022.01) |
| *H04L 9/40* | (2022.01) |

(52) U.S. Cl.

CPC .......... *H04L 41/12* (2013.01); *H04L 43/0852* (2013.01); *H04L 43/0876* (2013.01); *H04L 43/10* (2013.01); *H04L 63/1408* (2013.01)

(58) Field of Classification Search

CPC . H04L 41/12; H04L 43/0852; H04L 43/0876; H04L 43/10; H04L 63/1408

USPC ........................................................... 709/238

See application file for complete search history.

(56) References Cited

U.S. PATENT DOCUMENTS

| | | | | |
|---|---|---|---|---|
| 8,543,681 | B2 * | 9/2013 | Bearden | H04L 41/12 709/224 |
| 9,497,659 | B2 * | 11/2016 | Paladugu | H04W 28/24 |
| 11,528,187 | B1 * | 12/2022 | Volpe | H04L 43/0876 |
| 2015/0222489 | A1 * | 8/2015 | Perez Martinez | H04W 48/16 370/328 |

(Continued)

OTHER PUBLICATIONS

HPE, " Aruba 5400 zl Switch Series—How to Configure Uplink Failure Detection (UFD) with NIC Teaming", available online at <https://support.hpe.com/hpesc/public/docDisplay?docId=emr_na-c03286819>, 2024, 2 pages.

*Primary Examiner* — Nicholas R Taylor

(74) *Attorney, Agent, or Firm* — Trop, Pruner & Hu, P.C.

(57) ABSTRACT

A process includes determining, by an uplink identification engine, temporal usages of respective network interfaces of a plurality of network interfaces of a network device. The process includes, based on the temporal usages, identifying, by the uplink identification engine, a plurality of uplink candidates corresponding to respective network interfaces of the plurality of network devices. The process includes classifying, by the uplink identification engine, each uplink candidate as belonging to either a first group that is associated with a data link layer or a second group that is associated with a network layer. The process includes evaluating, by the uplink identification engine, the plurality of uplink candidates based on the respective classifications. The process includes identifying, by the uplink identification engine and based on the evaluation, a given network interface as being an uplink.

12 Claims, 10 Drawing Sheets

(56) References Cited

U.S. PATENT DOCUMENTS

| | | | | |
|---|---|---|---|---|
| 2016/0254956 | A1* | 9/2016 | Xu | H04L 41/0886 370/255 |
| 2019/0311130 | A1* | 10/2019 | Hodgman | G06F 21/577 |
| 2020/0077425 | A1* | 3/2020 | Silverman | H04W 72/1273 |
| 2024/0114358 | A1* | 4/2024 | Job | H04W 24/02 |

* cited by examiner

600

| FIG. 6A | FIG. 6B |
| --- | --- |

FIG. 6

600

| | INTERFACE NAME (606) | ROUTING (608) | BGP (610) | VLAN (614) | OSPF (618) | GATEWAY CONFIG. (622) |
| --- | --- | --- | --- | --- | --- | --- |
| 640-1 | 1/1/1 | YES | YES | N/A | YES | YES |
| 640-2 | 1/1/2 | NO | N/A | DEFAULT VLAN | N/A | YES |
| 640 | 1/1/3 | YES | NO | N/A | NO | NO |
| 640-4 | 1/1/4 | NO | N/A | NON-DEFAULT VLAN | N/A | YES |
| 640 | 1/1/5 | NO | N/A | NON-DEFAULT VLAN | N/A | NO |

FIG. 6A

600

| HIEARCHICAL LAYER (624) | NON-DEFAUT CONFIG. (628) | CATEGORY (632) | ASSOC. WITH TUNNEL (633) | TOP N LATENOY (634) | TOTAL SCORE (636) |
|---|---|---|---|---|---|
| ACCESS | YES | L3 | N/A | YES | 160 |
| ACCESS | YES | L2 | NO | N/A | 130 |
| ACCESS | YES | L3 | N/A | NO | 60 |
| ACCESS | YES | L2 | NO | N/A | 150 |
| ACCESS | YES | L2 | NO | N/A | 130 |

FIG. 6B

IDENTIFYING NETWORK DEVICE UPLINKS

BACKGROUND

A network management system (NMS) provides services to manage the network devices of a computer network. In examples, NMS services may identify network performance issues, detect network device failures, manage firmware upgrades, recognize security vulnerabilities and detect security attacks.

BRIEF DESCRIPTION OF THE DRAWINGS

FIG. 6, illustrated in partial views 6A and 6B, is a scorecard for uplink candidates according to an example implementation.

DETAILED DESCRIPTION

Figure 1:
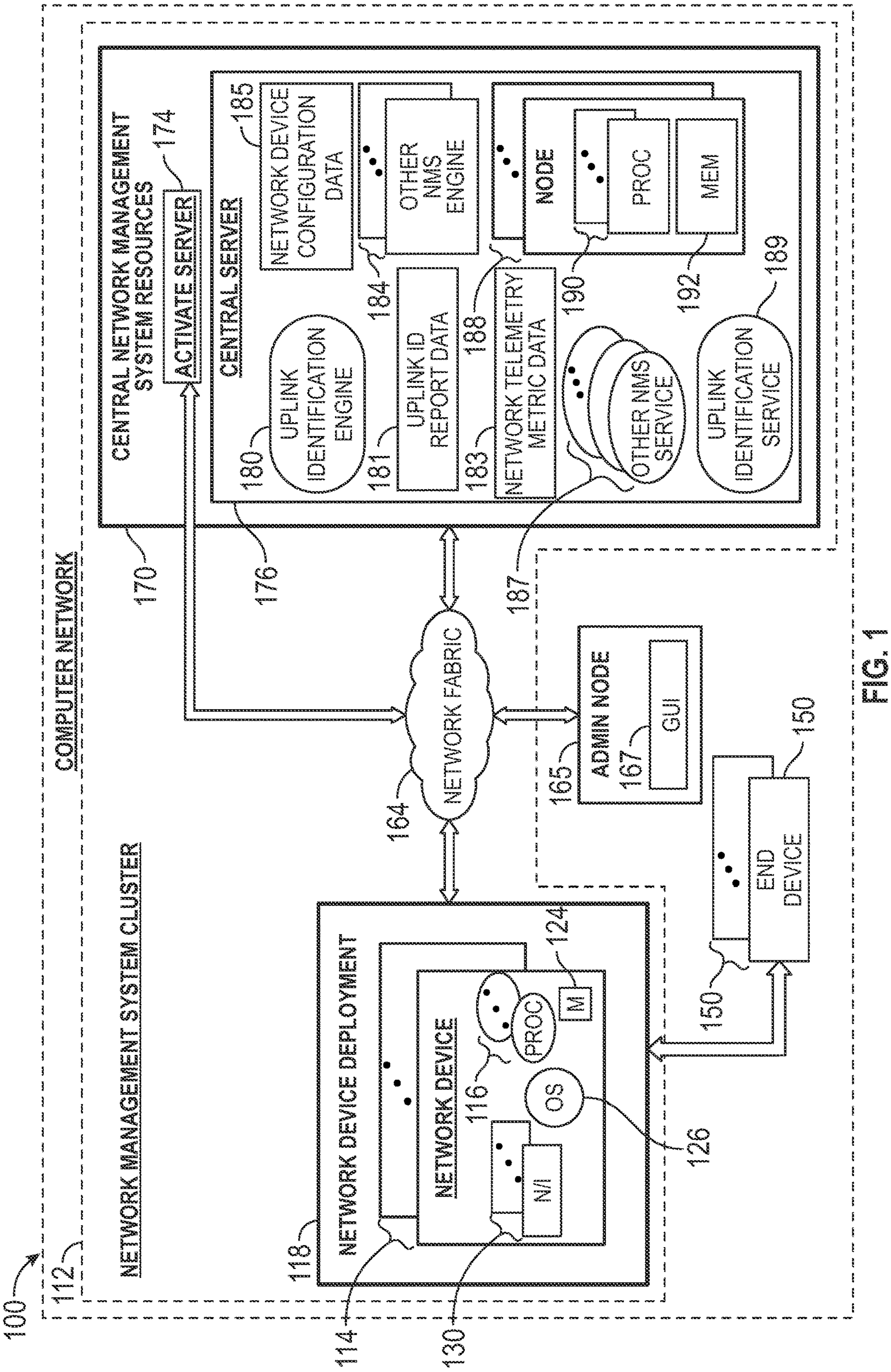
FIG. 1 is a block diagram of a computer network having a network management system (NMS) service that identifies network device uplinks according to an example implementation.

A network device (e.g., a network switch, a router or a gateway) may have a number of physical connection endpoints, which may be referred to as "network interfaces" (or "ports"). In an example, a network interface may be associated with a physical connector (e.g., a jack) that electrically and mechanically mates with a physical, wired communication link (e.g., a network cable). In another example, a network interface may be associated with a physical, wireless communication link (e.g., an Institute of Electrical and Electronics Engineers (IEEE) 802.11 link, often called a "WiFi" link). A network interface may serve any of a number of different purposes, depending on how the network interface is configured and how the network interface is connected into the network topology. In an example, a network device may be part of an access layer of a network and contain one or multiple network interfaces that communicate traffic with network end devices. In another example, for purposes of enhancing bandwidth for network traffic, multiple network interfaces (of one or multiple network devices) may be grouped together to form a single logical link called a "trunk" (or "link aggregation group"). In another example, a network interface may communicate traffic for a logical overlay network, such as a virtual local area network (VLAN). In another example, a network device may have network interfaces that are part of the same trunk and communicate traffic for multiple VLANs.

The network devices of a particular network may each be classified as belonging to a particular layer of a network hierarchy. The layers of a network hierarchy, in general, may have different associated bandwidths and serve different purposes. In an example, a network hierarchy may have an access layer, which is the lowest order of the hierarchy and has the lowest bandwidth among the layers. Network devices of the access layer may serve the primary function of connecting end devices to the network. In another example, the network hierarchy may have a distribution layer (or "aggregation layer"), which has a higher order than the access layer and is associated with a higher bandwidth than the access layer. Network devices of the distribution layer may provide a variety of functions. In examples, these functions may include connecting the network devices of the access layer, aggregating local area network (LAN) links, aggregating wide area network (WAN) links, routing, load balancing, as well as other functions. In another example, the network hierarchy may have a core layer, which has the highest order and is associated with the highest bandwidth. Network devices of the core layer connect the network devices of the distribution layer and serve the primary function of forwarding network traffic.

A network device, regardless of its network hierarchy layer affiliation, may have one or multiple network interfaces that are uplinks. In this context, an "uplink" refers to a network interface that communicates network traffic in a direction from a relatively lower order layer of a network hierarchy to a relatively higher order layer of the network hierarchy. In an example, an uplink may be a network interface of an access layer switch, which forwards network traffic to a network interface of a distribution layer router. Uplinks for a network device may not be pre-designated, as a given network interface may or may not be an uplink depending on a number of factors, such as the configuration of the network interface and how the network interface is connected within the network topology.

From a network management perspective, it may be beneficial to identify which network interfaces of a network device are uplinks. In an example, an NMS may monitor the utilizations of uplinks for purposes of assessing network health. In an example, an NMS may set upper and/or lower utilization thresholds for a particular uplink for purposes of generating alerts when the utilization of the uplink varies out of an expected range. It may be particularly challenging, however, to efficiently and accurately identify uplinks. Mislabeling network interfaces as uplinks may trigger false positive alerts, which may unnecessarily alarm network administrators. In one approach, NMS customers may manually enter data into the NMS for purposes of identifying uplinks. This approach, however, may be rather burdensome and may be prone to human error. An automated approach to identifying uplinks may involve an NMS considering usages (e.g., bandwidths) of network interfaces such that the NMS designates, for a network device, the network interface having the highest usage as being the uplink for the network device. This approach, however, may be a rather inaccurate way to identify uplinks due to such reasons as a network device having more than one uplink, the failure to consider network interface connections, the failure to consider the temporal use of the network interfaces, and the failure to consider traffic within the network device.

In accordance with example implementations, an automated uplink identification solution considers a comprehensive set of network interface attributes, which results in more accurate uplink classifications. In accordance with example implementations, the uplink identification solution recognizes that a given network device may have multiple uplinks. Moreover, the uplink identification solution takes the temporal uses of network interfaces (e.g., the use as influenced by business workday schedules, holidays and weekend hours) into account for purposes of properly identifying uplinks.

In accordance with example implementations, an uplink identification engine (e.g., an engine provided by cloud-based NMS resources) provides an uplink identification service for purposes of identifying network device uplinks. The uplink identification engine, in accordance with example implementations, identifies which network interfaces of a network device are uplinks based on information from a variety of sources, such as network telemetry metric data that is gathered by an NMS, network configuration data that is maintained by the NMS, and data that is acquired by the uplink identification engine accessing the network device. More specifically, in accordance with example implementations, for purposes of identifying the uplinks of a given network device, the uplink identification engine applies uplink elimination criteria to remove network interfaces of the network device from uplink consideration. The remaining network interfaces of the network device are part of a group, or pool, of "uplink candidates," and the uplink identification engine applies additional criteria for purposes of potentially eliminating one or multiple uplink candidates from the pool, as well as assigning respective scores to the uplink candidates that remain in the pool. In accordance with example implementations, the uplink identification engine determines likelihoods, or probabilities, for the respective uplink candidates based on their respective scores, and the uplink identification engine selects, from the pool, the top M uplink candidates that have the highest respective probabilities. In accordance with some implementations, the top M uplink candidates correspond to the identified uplinks (called "likely uplinks" herein) for the network device.

The uplink elimination criteria may consider any of a number of different factors, depending on the particular implementation. In an example, the uplink elimination criteria may eliminate network interfaces from uplink consideration, which are not active. In general, a network interface is active if the link state that is associated with the network interface is "up." Determining whether a network interface is active based on a single sample of the interface's link state may not accurately reflect how the network interface is being used over time, and accordingly, the single sample may not be an accurate indicator of whether the network interface is active. In this manner, the usage of a network and the usage of its corresponding network devices and network interfaces may vary according to a business schedule. In an example, the network and its network interfaces may be expected to be used more daily during certain hours (e.g., 9 AM to 5 PM) and certain weekdays; and the network and its network interfaces may be expected to have lighter usages during non-business hours (e.g., after 5 PM on weekdays, holidays and weekends). An uplink may, for example, have, during non-business hours, more down link states than up link states.

In accordance with example implementations, the uplink identification engine performs a temporal analysis (or "time series analysis") of the link state that is associated with a network interface for purposes of determining whether or not to eliminate the network interface from uplink consideration. In an example, the uplink identification engine may eliminate a network interface from uplink consideration in response to the network interface not having a single instance of an uplink state during a contiguous observation time period that includes business and non-business hours. In examples, the observation time period may span more than twenty-four hours for a weekday, more than seventy-two hours for a weekend or more than the time corresponding to a holiday.

The uplink elimination criteria may include one or multiple criteria, other than the link state, which is consistent with the network interface not being an uplink. In an example of other uplink elimination criteria, the uplink identification engine may determine whether a network interface has a default configuration (e.g., the configuration when the network device is powered up for the first time in production). In accordance with example implementations, if the uplink identification engine determines that the network interface has a default configuration, then the uplink identification engine removes the network interface from uplink consideration.

In another example of uplink elimination criteria, the uplink identification engine may eliminate a network interface from uplink consideration if the network interface uses a supply power-over-communication link technology, such as a Power over Ethernet (POE) technology. A supply power-over-communication link technology, in general, supplies, through the communication link, power to end devices, such as IoT devices, sensors, cameras, or other devices.

In accordance with example implementations, the uplink identification engine, after applying the uplink elimination criteria and determining that a given network interface is an uplink candidate, classifies the network interface as being either affiliated with the layer two (L2) layer or the layer three (L3) layer. Here, the "L2 layer" refers to the data link layer of the Open Systems Interconnection (OSI) model, and the "L3 layer" refers to the network layer of the OSI model. In accordance with example implementations, the uplink identification engine applies a first set of criteria (called "L2 criteria" or "L2 rules" herein) to L2 layer-affiliated uplink candidates. The uplink identification engine applies a second set of criteria (called "L3 criteria" or "L3 rules") to L3 layer-affiliated uplink candidates. In accordance with some implementations, applying the L2 or L3 criteria to an uplink candidate may include the uplink identification engine determining a score for the uplink candidate based on the L2 or L3 criteria. Moreover, as described herein, applying the L2 or L3 criteria to an uplink candidate may include the uplink identification engine redesignating the network interface as not being an uplink candidate (and therefore removing the network interfaces from the pool of uplink candidates).

The application of the L2 and L3 criteria, in accordance with example implementations, results in a pool of uplink candidates and a set of scores for the respective uplink candidates. In accordance with example implementations, the uplink identification engine determines probabilities for the uplink candidates based on their respective scores. Here, the "probability" associated with an uplink candidate refers to likelihood that the uplink candidate is an actual uplink. Moreover, in accordance with example implementations, the uplink identification engine ranks the uplink candidate based on their respective probabilities and selects the top M uplink candidates of this ranking. Here, "M" is an integer equal to or greater than one. The top M uplink candidates are referred to herein as the "likely uplinks" for the network device.

The uplink identification engine may determine the probability for a given uplink candidate in any of a number of different ways. In an example, the probability may be a linear function of the score (e.g., the uplink candidate score divided by the maximum possible score). In another example, the probability may be a nonlinear function of the score. In another example, the probability may be based on the score and one or multiple statistics (e.g., mean, standard distribution, expected value or variance) of the scores of the uplink candidates.

The uplink identification engine, in accordance with example implementations, may generate data that identifies the likely uplinks and their associated probabilities, and the uplink identification engine may send the data to an administrative dashboard (e.g., a system administrator graphical user interface (GUI)) for an NMS. In an example, a network administrator may tune network management-affiliated parameters based on the identified likely uplinks. In an example, a network administrator may set alert-generating usage thresholds for all of the identified likely uplinks. In another example, a network administrator may set alert-generating usage thresholds for likely uplinks that have corresponding probabilities above a certain probability threshold. In another example, a network administrator may tune network management-affiliated parameters by applying other criteria to the identified likely uplinks.

Referring to FIG. 1, as a more specific example, in accordance with some implementations, a computer network 100 includes one or multiple NMS clusters 112. Each NMS cluster 112 includes central NMS resources 170 and one or multiple network device deployments 118. The network device deployment 118 includes network devices 114 (also called "managed network devices 114" herein) that are managed by an associated NMS cluster 112. Each managed network device 114 has a collection of network interfaces 130, and for a given managed network device 114, one or multiple network interfaces 130 of the managed network device 114 may be uplinks. The network devices 114 communicate network traffic with network end devices 150 (e.g., Internet of Things (IoT) devices, cameras, sensors, computers, servers, laptops, tablets, smartphones, printers, scanners, digital copiers, or other processor-based devices).

In an example, the network device deployment 118 may correspond to a local branch network (e.g., a local area network (LAN)). In other examples, the network device deployment 118 may include multiple local branch networks. The network device deployment 118 may be associated with a particular geographical location, such as a campus site, a data center site, city, state, country or other geographical site. In accordance with some implementations, the central NMS resources 170 may be cloud-based resources that may be located in one or multiple data centers. In an example, a particular network device deployment 118 may be associated with a particular NMS customer identification (ID).

In accordance with example implementations, the managed network devices 114 and the central NMS resources 170 may communicate over network fabric 164. In accordance with example implementations, the network fabric 164 may be associated with one or multiple types of communication networks, such as (as examples) Fibre Channel networks, Compute Express Link (CXL) fabric, dedicated management networks, local area networks (LANs), WANs, global networks (e.g., the Internet), wireless networks, or any combination thereof.

In accordance with example implementations, the central NMS resources 170 include a central server 176 that provides one or multiple NMS services. In an example, accordance with example implementations, the central server 176 includes an uplink identification engine 180 that provides an NMS service (called an "uplink identification service 189" herein) to identify likely uplinks of the managed network devices 114. In an example, the uplink identification service 189 may, for a given managed network device 114, provide data that represents the top M most likely uplinks for the managed network device 114, along with, for each likely uplink, a likelihood, or probability, that the likely uplink is an actual uplink.

In an example, the uplink identification service 189 may generate data 181 that represents an uplink identification report that identifies likely uplinks for the managed network devices 114 and the associated probabilities that the likely uplinks are actual uplinks. The uplink identification engine 180 may, for example, send the data to a dashboard of an administrative node 165 of the computer network 100. In an example, the dashboard may be a graphical user interface (GUI) 167. In an example, the GUI 167 may be provided by specific client software that is executed on an administrative node 165 or, as another example, may be provided by an Internet browser that executes on the administrative node 165. Regardless of its form, the GUI 167 may be constructed to allow the selection of specific network devices 114 and display the likely uplinks for the selected network devices 114, along with displaying the associated probabilities for the likely uplinks. Moreover, the GUI 167 may be constructed to provide tools for a network administrator to manage the network devices 114, including tuning various management parameters. In an example, a network administrator may, using the GUI 167, identify likely uplinks for a particular network device 114 and set usage-based alert thresholds for these likely uplinks.

In an example, an uplink identification report may identify the top M likely uplinks for each network device 114 and the respective associated probabilities; and the network administrator may set one or multiple usage thresholds (e.g., high threshold and/or a low threshold) for each of the M likely uplinks. A usage threshold (e.g., an ingress bandwidth, an egress bandwidth, or other usage threshold) corresponds to an expected range boundary, so that if the usage of the uplink varies beyond the expected range boundary, the NMS generates an alert (e.g., an alert message that is displayed on the GUI 167, an alert message that is communicated to a network administrator, or another alert). In another example, a network administrator may be more selective and for a given network device 114, set usage thresholds for the M likely uplinks that have associated probabilities above a certain administrator-selected probability threshold.

A user dashboard, such as the GUI 167, may, in general, provide user access to a suite of NMS services 187 for managing various aspects of an NMS cluster 112, in addition to providing access to the uplink identification service 189 and setting usage alert thresholds. The NMS services 187 may be provided by respective NMS engines 184. In an example, an NMS service 187 may configure managed network devices 114. In another example, an NMS service 187 may transfer uploaded configuration data (e.g., configuration files and profiles) to managed network devices 114. In another example, an NMS service 187 may schedule and initiate firmware upgrades on managed network devices 114.

In another example, network NMS services 187 may be used to visualize, analyze, log, collect query and/or monitoring network telemetry metrics that are reported by the managed network devices 114. In an example, an NMS service 187 may identify potential or actual network device failure issues based on network telemetry metric values. In another example, an NMS service 187 may identify potential or actual network performance issues (e.g., issues with a network device or a subnet) based on network telemetry metric values. In another example, an NMS service 187 may oversee remedial actions to correct network issues. In another example, an NMS service 187 may identify performance issues with a customer device (e.g., a server) that is connected to or part of the network device deployment 118. In another example, an NMS service 187 may log network events and maintain one or multiple corresponding logs. In another example, an NMS service 187 may serve responses to queries related to obtaining information about the network device deployment 118. In another example, an NMS service 187 may provide a recommended solution for an identified network issue. In an example, a recommendation may be a suggested reconfiguration, upgrade, or replacement for one or multiple network devices 114. In another example, a recommendation may be a suggested reconfiguration of a particular network subnet. In another example, a recommendation may be a suggested firmware upgrade for a particular network device 114 or group of network devices 114.

The managed network devices 114, in accordance with example implementations, report telemetry metrics to the central server 176 via network telemetry metric message flows. In the context that is used herein, a "network telemetry metric" refers to information or content from which an insight to a state of a network, network device or client device connected to network device(s) may be directly or indirectly determined. In an example, a network telemetry metric may be a periodically measured statistic of a network or network device. In an example, a statistic may be a traffic flow volume (e.g., a traffic flow volume for a particular VLAN) for a particular sampling period. In other examples, a statistic may be a periodically measured egress bandwidth, an ingress bandwidth, a latency, a round trip time, or a usage of a resource or an activity of a host. In another example, a network telemetry metric may be a link state associated with a network interface of a network device. In other examples, a network telemetry metric may represent a value of a counter of a network device, a configuration setting of a network device, an event log of a network device, a state snapshot of a network device, a configuration snapshot of a network device, or other information about a network device. Network telemetry metrics may correspond to events. In an example, a network device 114 may report a network telemetry metric via network telemetry messages, which are triggered by certain change events (for an on-change subscription) or which are sent by the network device 114 according to a certain reporting interval (for a periodic subscription). In general, network telemetry metrics may represent information about the control, management and/or data planes of a network.

The central server 176 may maintain network telemetry metric data 183 for the network device deployment 118, which represents network telemetry metrics that have been reported by the managed network devices 114. The network telemetry metric data 183 may be stored locally on the central server 176 or elsewhere. The central server 176 may also maintain network device configuration data 185 for the managed network devices 114. The network device configuration data 185 may be stored locally on the central server 176 or elsewhere.

As further described herein, the uplink identification engine 180 may evaluate the network interfaces 130 of the network devices 114 for purposes of identifying likely uplinks and the likelihoods, or probabilities, that these uplinks are actual uplinks. The result of this evaluation may be represented by the uplink identification report data 181. For this evaluation, the uplink identification engine 180 may consider a number of inputs, such as the network telemetry metric data 183, the network device configuration data 185 and possibly other data (e.g., data acquired by the engine 180 accessing the network devices 114).

The central NMS resources 170 may include an activate server 174. In an example, when a network device 114 first connects to the network device deployment 118, a dynamic host protocol configuration (DHCP) server may provide, to the network device 114, an Internet Protocol (IP) address of the activate server 174 (e.g., provide the IP address as a DHCP option). The activate server 174, among its other functions, validates the network device 114, and the activate server 174 provides, to the network device 114, upon successful validation, network artifacts (e.g., an IP address and credentials) for connecting to the central server 176.

In the context that is used herein, a "network device" refers to an actual, or physical electronic component, which enables data communication between other components. In an example, a network device 114 may be a switch that operates at the L2, or data link, layer, of the OSI model to connect components of a computer network together. In another example, a network device 114 may operate at the L3, or network, layer, of the OSI model to connect both components of a computer network together and connect computer networks together. An L3 network device performs routing between multiple computer networks. In other examples, a network device 114 may be a gateway, a multicast router, a bridge, a component of a Gen-Z or a Compute Express Link (CXL) network, a processor device, a network interface controller (NIC) or a fabric switch that includes one or multiple of the foregoing devices. A network device 114 may be a wired or wireless device. An L2 network device 114 contains L2 network interfaces 130, and an L3 network device 114 contains L3 network interfaces 130. The network interfaces 130 of a given network device 114 may be all L2 network interfaces, all L3 network interfaces, or a combination of L2 network interfaces and L3 network interfaces.

In accordance with further implementations, the network device 114 may be a computer platform. In the context that is used herein, a "computer platform" refers to a processor-based electronic device, which has an associated operating system. For the example implementation that is depicted in FIG. 1, in addition to the network interfaces 130, the network device 114 may include an operating system 126 and one or multiple hardware processors 116. In an example, a hardware processor 116 may include one or multiple central processing unit (CPU) processing cores. In another example, a hardware processor 116 may include one or multiple CPU packages, or sockets. In another example, a hardware processor 116 may include one or multiple graphic processing unit (GPU) processing cores. In another example, a hardware processor 116 may include one or multiple GPU packages.

The network device 114 may further include a system memory 124. The system memory 124 as well as other memories that are discussed herein are non-transitory storage media that may be formed from semiconductor storage devices, memristor-based storage devices, magnetic storage devices, phase change memory devices, a combination of devices of one or more of these storage technologies, and so forth. The non-transitory storage media may represent a collection of volatile memory devices and non-volatile memory devices, in accordance with example implementations.

In accordance with some implementations, the central server 176 includes one or multiple nodes 188 that execute machine-readable instructions (or "software"). In the context that is used herein, a "node" refers to a processor-based entity that has an associated set of hardware and software resources. As depicted in FIG. 1, a node 188 may have one or multiple associated hardware processors 190 (e.g., one or multiple central processing unit (CPU) cores and/or one of multiple graphical processing unit (GPU) cores) and an associated memory 192. In accordance with some implementations, the memory 192 may store machine-readable instructions that, when executed by one or multiple hardware processors 190, cause the hardware processor(s) 190 to form instances of components of the activate server 174 and the central server 176. In an example, the memory 192 may store machine-readable instructions that, when executed by one or multiple hardware processors 190 cause the hardware processor(s) 190 to form an instance of the uplink identification engine 180. In other examples, the memory 192 may store machine-readable instructions that, when executed by one or multiple hardware processors 190 cause the hardware processor(s) 190 to form one or multiple other NMS engines 184.

In an example, a node 188 may be an actual, or physical, entity, such as a computer platform or a part (e.g., a part corresponding to a group of CPU cores or CPU cores) of a computer platform. In examples, a computer platform may be a rack server or blade server. In another example, a node 188 may be a virtual entity that is an abstraction of physical hardware and software resources, such as a virtual machine. Depending on the particular implementation, multiple nodes 188 may be located on one or multiple virtual or physical machines. Moreover, in accordance with example implementations, nodes 188 may be distributed across virtual or physical machines that are located at different geographical locations (e.g., located in different data centers).

As used here, an "engine" can refer to one or more circuits. For example, the circuits may be hardware processing circuits, which can include any or some combination of a microprocessor, a core of a multi-core microprocessor, a microcontroller, a programmable integrated circuit (e.g., a programmable logic device (PLD), such as a complex PLD (CPLD)), a programmable gate array (e.g., field programmable gate array (FPGA)), an application specific integrated circuit (ASIC), or another hardware processing circuit. An "engine" can refer to a combination of one or more hardware processing circuits and machine-readable instructions (software and/or firmware) executable on the one or more hardware processing circuits. In accordance with some implementations, one or multiple engines of the central NMS resources 170, such as the uplink identification engine 180, may be formed by one or multiple hardware processors 190 executing machine-readable instructions.

In accordance with some implementations, the central NMS resources 170 may include multiple activate servers 174 and multiple central servers 176 for the same NMS cluster 112. In an example, for high availability (HA), a given service container for a particular cluster 112 may contain an HA group of activate servers 174 and an HA group of central servers 176, so that should a given active server 174,176 fail, another server 174,176 may take over for the failed server 174,176 of the HA group.

Figure 2:
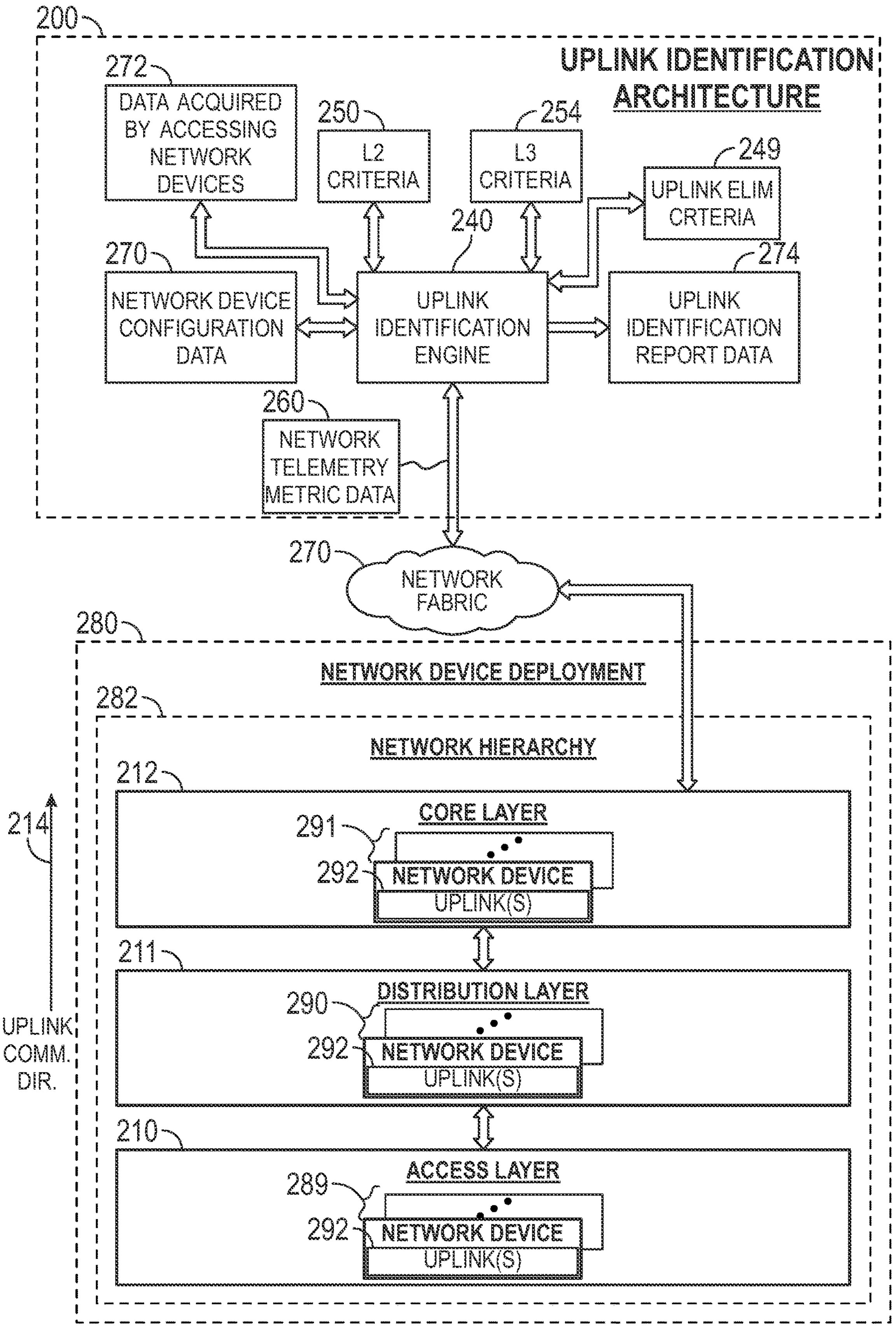
FIG. 2 is an illustration of an uplink identification architecture and a network device deployment according to an example implementation.

FIG. 2 illustrates an uplink identification architecture 200 and an example network device deployment 280 according to an example implementation. Referring to FIG. 2, for this example, the uplink identification architecture 200 includes an uplink identification engine 240, which is coupled to network devices 289, 290 and 291 of the network device deployment 280 via network fabric 270. The uplink identification engine 180 of FIG. 1 is an example of the uplink identification engine 240. The network devices 114 of FIG. 1 are examples of the network devices 289, 290 and 291. The network devices 289, 290 and 291 are associated with different tiers, or layers, of a network hierarchy 282, such as an access layer 210, a distribution layer 211 (also called an "aggregation layer") and a core layer 212, respectively.

For the example implementation that is depicted in FIG. 2, the network hierarchy 282 includes three tiers, or layers. The access layer 210 has the lowest associated bandwidth of the three tiers, as the network devices 289 of the access layer 210 have relatively lower respective associated bandwidths (e.g., ingress bandwidths and egress bandwidths), as compared to the bandwidths of the network devices 290 and 291. In examples, the network devices 289 may be L2 access switches, wireless access points and other devices that connect end devices to a network.

The distribution layer 211, the middle tier of the network hierarchy 282, is associated with a bandwidth that is larger than the bandwidth that is associated with the access layer 210 and lower than the bandwidth that is associated with the core layer 212. In this manner, the network devices 290 of the distribution layer 211 may be associated with relatively larger respective bandwidths, as compared to the bandwidth of any network device 289 of the access layer 210. The network devices 290 of the distribution layer 211, in examples, may be routers, multi-layer switches and other devices that connect the network devices 289 of the access layer 210. The network devices 290 may perform a variety of functions in addition to connecting the network devices 290. In examples, the network devices 290 may aggregate LAN links, aggregate WAN links, perform routing between different routing domains, provide load balancing, provide network security services, as well as perform other network-related operations.

The core layer 212, the uppermost tier of the network hierarchy 282, is associated with a bandwidth that is larger than the bandwidth of the distribution layer 211. In this manner, the network devices 291 of the core layer 212 have the relatively largest specific bandwidths, as compared to the bandwidths of any network device 290 or 289. In an example, the network devices 291 of the core layer 212 may be fiber optic switches. In an example, the primary function of the core layer 212 (and the network devices 291) may be forwarding network traffic.

In other examples, managed network devices of a network deployment may be part of a network hierarchy that has fewer or more than three tiers, or layers. In an example, the network devices of a network deployment may be part of a two-tier network hierarchy that has an access layer and a distribution layer but no core layer.

Regardless of its number of tiers, or layers, a network hierarchy, such as example network hierarchy 282, has an associated uplink communication direction 214. Network traffic that is communicated in a path along the uplink communication direction 214 has an increasing bandwidth along the path. As depicted in FIG. 2, a given network device 289, 290 or 291 may have one or multiple network interfaces that are respective uplinks 292. An uplink 292 forwards network traffic in the direction 214. In an example, an uplink 292 of a network device 289 of the access layer 210 may forward network traffic from an end device along one or multiple paths having respective next hops that correspond to network interface(s) of network device(s) 290 of the distribution layer 211. In another example, an uplink 292 of a network device 290 of the distribution layer 211 may forward network traffic received from the access layer 210 along one or multiple paths having respective next hops that correspond to network interface(s) of network device(s) 291 of the core layer 212. In another example, a network interface of a network device 289 of the access layer 210, which is connected to an end device is not an uplink. In another example, network interfaces that forward traffic laterally within a particular access layer are not uplinks.

In accordance with example implementations, the uplink identification engine 240 processes information provided by multiple sources, for purposes of generating data 274 that represents an uplink identification report. In an example, the uplink identification report identifies the top M likely uplinks for each network device of the network device deployment 280, along with likelihoods, or probabilities, of the likely uplinks being actual uplinks. In an example, the uplink identification engine 240 considers network telemetry metric data 260, which represents network telemetry metrics that are reported by the network devices. In an example, the uplink identification engine 240 considers network configuration data 270 in the uplink evaluation. The network configuration data 270 may represents any of a number of different configuration settings of the network devices, such as Quality of Service (QOS) settings, Class of Service (CoS) settings, virtual local area network (VLAN) tagging settings, VLAN untagging settings, ingress bandwidth settings, egress bandwidth settings, PoE settings, as well as different and/or other configurable settings. In an example, the uplink identification engine 240, may access network devices, as described herein, for purposes of acquiring data 272 used for uplink evaluation.

The uplink identification engine 240, in accordance with example implementations, identifies the uplinks for a given network device by iteratively processing the network interfaces of the network device. More specifically, for each network interface, the iteration is associated with three phases. In the first phase, the uplink identification engine 240 determines whether the network interface belongs to a group, or pool (herein called the "uplink candidate pool"), of uplink candidates. Here, an "uplink candidate" refers to a particular network interface, which is further evaluated for purposes of determining whether or not the network interface is a likely uplink. In the second phase, the uplink identification engine 240 applies additional criteria to determine if the network interface is in the uplink candidate pool, whether the network interface should remain in the pool, and if so, the uplink identification engine 240 generates an associated score for the network interface. In the third phase, if the network interface is still an uplink candidate by the third phase, the uplink identification engine 240 determines a likelihood, or probability, that the network interface is an actual uplink. Moreover, in the third phase, the uplink identification engine 240 updates a ranking of the uplink candidate based on their respective probabilities and determines whether the network interface has an associated probability that is in the top M probabilities of all of the uplink candidates. If so, then the network interface is considered a "likely uplink".

More specifically, in the first phase, the uplink identification engine 240 first applies elimination criteria 249 to determine whether the network interface cannot be an uplink. In an example, the uplink identification engine 240 may apply the elimination criteria 249 based on information represented by the network device configuration data 270 and the network telemetry metric data 260, as further described herein in connection with FIG. 3. Therefore, if not eliminated by the application of the elimination criteria 249, the network interface corresponds to an uplink candidate of the uplink candidate pool.

Assuming that the network interface is an uplink candidate after the application of the elimination criteria 249, in the second phase, the uplink identification engine 240 applies additional criteria. The application of the additional criteria further refines the membership of the uplink candidate pool, and if the network interface remains in the uplink candidate pool, the application of the additional criteria assigns a score to the network interface. In accordance with example implementations, the specific additional criteria that is applied to the network interface depends on whether the network interface is an L2 interface or an L3 interface. In an example, for a network interface that is an L2 interface (e.g., a network interface that does not perform routing), the uplink identification engine 240 applies criteria that corresponds to a set of L2 rules 250. In an example, the uplink identification engine 24 may apply the L2 rules 250 based on information derived from the network device configuration data 270 and/or data 272 acquired by accessing the network device. An example of applying the L2 rules 250 is described below in connection with FIG. 4. In another example, for an uplink candidate that is an L3 interface (e.g., a network interface that performs routing), the uplink identification engine 240 applies criteria that correspond to a set of L3 rules 254. In an example, the uplink identification engine 24 may apply the L3 rules 254 based on information derived from the network device configuration data 270 and/or data 272 acquired by accessing the network device. An example of an application of the L3 rules 254 to an L3 interface is described below in connection with FIG. 5.

In accordance with example implementations, if the network interface remains an uplink candidate at the conclusion of the second phase, then the network interface has been assigned a score. The uplink identification engine 240 may then determine a likelihood, or probability, that the network interface is an actual uplink based on the score. In an example, the probability may be a linear function of the score (e.g., the uplink candidate score divided by the maximum possible score). In another example, the probability may be a nonlinear function of the score. In another example, the probability may be based on the score and one or multiple statistics (e.g., mean, standard distribution, expected value or variance) of the scores of the uplink candidates.

Figure 3:
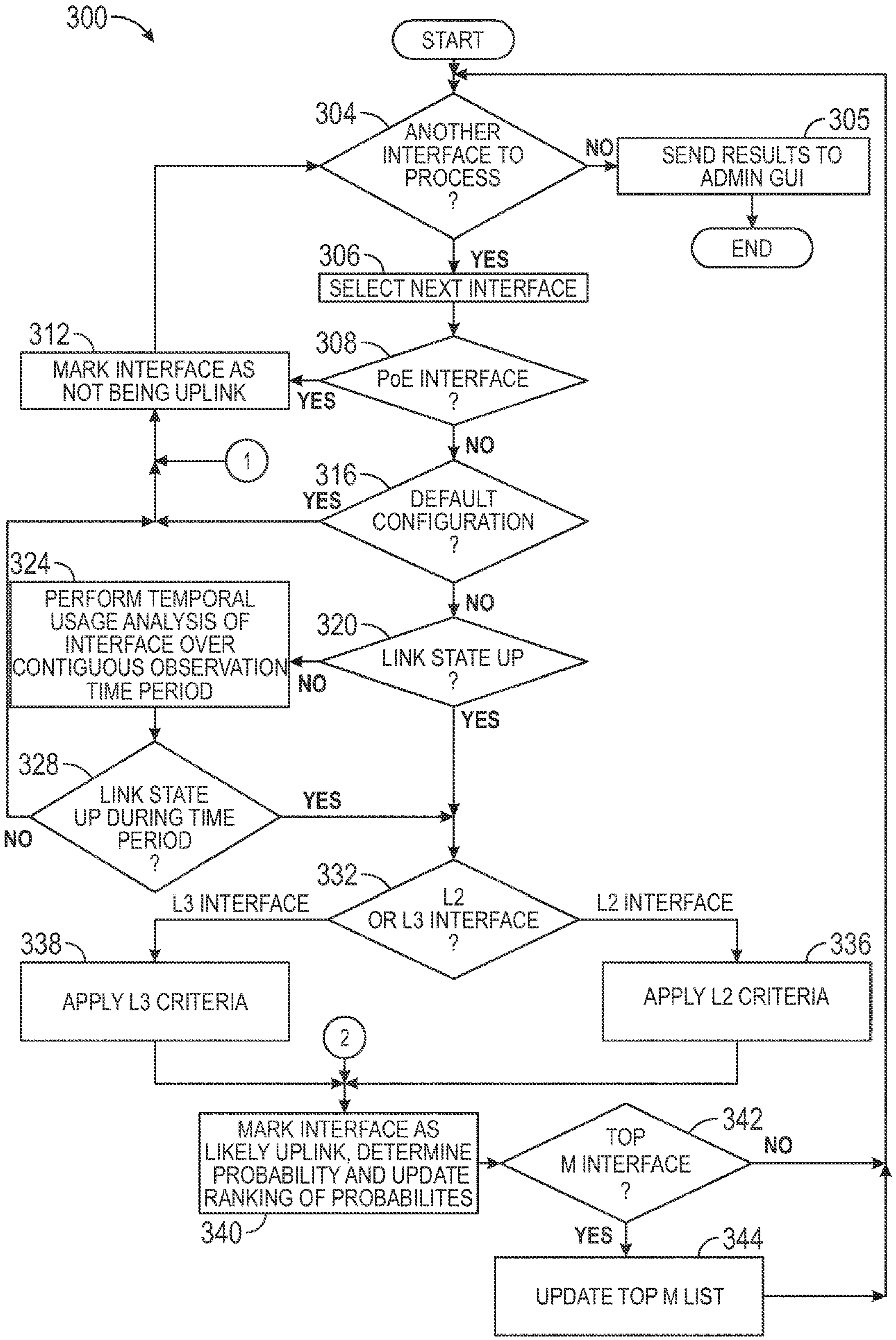
FIG. 3 is a flow diagram depicting a process to identify a top M list of likely uplinks for a network device according to an example implementation.

FIG. 3 is an illustration of a process 300 to identify a top M list of likely uplinks for a network device and assign probabilities to the likely uplinks according to an example implementation. In examples, an uplink identification engine, such as the uplink identification engine 180 of FIG. 1 or the uplink identification engine 240 of FIG. 2, may perform the process 300.

Referring to FIG. 3, in accordance with example implementations, the process 300 advances sequentially through the network interfaces of a network device in multiple iterations, with each iteration evaluating a network interface. In accordance with example implementations, each iteration may have up to three phases, depending on the attributes of the network interface. In this first phase, the iteration includes determining whether the network interface should be excluded from or included in a pool of uplink candidates for the network device. At conclusion of the first phase, the network interface is either an uplink candidate that is further evaluated in the second phase, or the network interface is removed from uplink consideration (and the iteration ends). In the second phase, the iteration includes selecting and applying either L2 criteria (if the network interface is an L2 interface) or L3 criteria (if the network interface is an L3 interface). The application of the L2 or L3 criteria in the second phase results in either 1. the network interface being removed from the pool of uplink candidates (and the iteration ending); or 2. the network interface remaining in the pool of uplink candidates and being assigned a score. If the network interface remains in the pool of uplink candidates after the second phase, then, in the third phase, the iteration includes updating a ranking of the uplink candidates based on their respective scores. The third phase further includes determining, based on the ranking, whether the network interface is in the top M uplink link candidates, and if so, updating a top M list of uplink candidates to include the network interface. At the end of the iterations after all of the network interfaces of the network device have been evaluated, the top M list of uplink candidates corresponds to the top M likely uplinks of the network device.

As more specific example, in accordance with example implementations, the process 300 includes determining (decision block 304) whether there is another network interface of the network device to process. If not, then all of the network interfaces of the network device have been evaluated, which results, as described herein, in a list of M likely uplinks for the network device and their associated likelihoods, or probabilities, of being actual uplinks. As depicted at 305, after all network interfaces have been evaluated, the process 300 sending the results to an administrative GUI. In an example, sending the results to an administrative GUI includes generating data that represents a report of the M likely uplinks and their associated probabilities, and sending the data to the GUI. In another example, the results may be in the form of a report that is completed after all of the managed network devices of the network device deployment have been evaluated.

If, pursuant to decision block 304, there is another network interface of the network device to process, then the process 300 proceeds to block 306 to begin an iteration of the process 300 in which the network interface is evaluated for purposes of determining whether the network interface is a likely uplink. The iteration begins with the first phase in which elimination criteria are applied for purposes of determining whether the network interface should be excluded from a pool of uplink candidates. In this manner, before the uplink evaluation of the network interfaces, all of the network interfaces may be considered uplink candidates, and the application of the elimination criteria determines whether or not the network interface should be removed from the pool of uplink candidates.

In an example of an elimination criterion, the process 300 may determine (decision block 308) whether the network interface is associated with a supply power-over-communication link technology, such as a PoE technology. In an example, a network interface may be configurable whether or not PoE is enabled, and decision block 308 includes determining if PoE is enabled. In another example, a network interface may be a dedicated PoE interface. If the network interface has PoE enabled (whether configurable or not), the process 300 eliminates the network interface from uplink consideration, as the network interface is connected to an end-user device. The elimination, or removal, of the network interface from uplink consideration includes labeling, or marking (block 312), the network interface as not being an uplink. The effect of marking of the network interface as not being an uplink is that the network interface is not included in the pool of uplink candidates.

If, however, the network interface does not implement a power supply technology, then, the iteration proceeds to decision block 316, which is an example of another elimination criterion. As depicted in decision block 316, the process 300 includes determining whether the network interface has a default configuration. In this context, a "default configuration" refers to a particular setup for a network interface, which exists on first power up of the network device. Although the setup may be modified after first powerup of the network device, a default configuration for a network interface means that the setup has not been modified.

The default configuration may correspond to a particular collection of settings for the network device. Moreover, the collection of settings corresponding to the default configuration may depend on whether the network interface is an L2 interface or an L3 interface. In examples, the collection of settings corresponding to the default configuration may be any of a number of different configurable settings for the network device, such as a QoS setting, a CoS setting, a VLAN untagging setting, an ingress bandwidth setting, an egress bandwidth setting, as well as other and/or different settings. Regardless of the particular settings that are designated for the collection of settings that correspond to a default configuration, if uplink identification engine determines that the network interface has the default configuration, then the process 300 marks (block 312) the network interface as not being uplink.

If the network interface does not have a default configuration, then the iteration proceeds to decision block 320, which is another example of an elimination criterion. Pursuant to decision block 320, the process 300 determines whether the link state of the network interface is active, or up. This decision, in accordance with example implementations, may be made by examining the current, or most recent link state, as represented by network telemetry metric data for the network interface. The sampling of the current link state, however, may not be an accurate indication of whether the network interface is active, or being used. In this manner, in accordance with example implementations, the process 300 recognizes that the use of a network interface may vary with time in accordance with a business work schedule. In an example, a particular network interface, even if an uplink, may, during off business hours, may not be used or may be used less frequently, as compared to business hours. For example, a given network interface may be used relatively sparingly during night hours, weekends and/or holidays. Therefore, in accordance with example implementations, the process 300 applies a time, or temporal, analysis to evaluate the link state of the network interface.

More specifically, in accordance with some implementations, if, pursuant to decision block 320, a determination is made that the link state is down, then the process 300 performs (block 324) a temporal usage analysis of the interface over a contiguous observation time period. The temporal usage analysis includes determining whether the link state was up during the observation time period. In an example, in block 324, the process 300 may include examining a link state log of the network interface over a particular time period that has a sufficient time length to accommodate off business hour and on business hour usage of the network interface. The link state log may contain, for example, records that correspond to events in which the link state changed. Therefore, in an example, the link state log may contain data that represents that during the time period, the network interface had at least one up link state. In another example, the link state log may contain data that represents that the network interface did not have a single instance of a link up state during the time period. In an example, the time period may be greater than twenty-four hours. In another example, the time period may be greater than seventy-two hours to accommodate a weekend. In another example, the time period may be greater than twenty-four hours to accommodate a holiday.

If, pursuant to decision block 328, the link state was up during the time period, then the network interface may be an uplink, and control proceeds to decision block 332. In an example, determining that the link state was up during the observation time period corresponds to identifying at least one instance of the link state being up during the observation time period (e.g., identifying a toggling of the link state from being down to being up). In another example, determining that the link state was up during the observation time period corresponds to identifying at least a predetermined number of instances of the link state being up during the observation time period.

For the example implementation that is depicted in FIG. 3, decision block 332 demarcates the end of the first phase of the iteration and the beginning of the second phase. In the second phase, the iteration further evaluates the network interface if the network interface has not been removed from uplink consideration in the first phase. In accordance with example implementations, pursuant to decision block 332, the process 300 determines whether the network interface is an L2 interface or L3 interface. If the network interface is an L2 interface, then the process 300 applies L2 criteria to evaluate the network interface, as depicted in block 336. If, in decision block 332, the process 300 determines that the network interface is an L3 interface, then the process 300 applies L3 criteria to evaluate the network interface, as depicted in block 338. As further described herein, in accordance with some implementations, the process 300 may remove the network interface from the pool of uplink candidates as a result of the application of the L2 criteria (block 336) or L3 criteria (block 338). Moreover, as further described here, for a network interface that remains in the pool of uplink candidates, the application of the L2 criteria (block 336) or L3 criteria (block 338) results in a score being determined for the network interface.

In accordance with further implementations, the process 300 may include determining score contributions for the uplink candidates based on criteria other than L2 and L3 criteria. In this manner, the additional criteria may be considered after block 336 (for an L2 interface) or block 338 (for an L3 interface). In an example, the process 300 may further include, after block 336 or 338 and before block 340, determining whether the network interface has a gateway configuration. If so, then the process 300 may include adding a contribution to the score, and otherwise, if no gateway configuration, not adding the contribution. In another example, the process 300 may further include, after block 336 or 338 and before block 340, determining the specific hierarchical layer (e.g., access layer, distribution layer or core layer) associated with the network interface and adding a contribution to the score based on specific hierarchical layer. For example, contributions of 30, 40 or 60 may be added to the score, depending on whether the interface is associated with the access layer, the distribution layer or the core layer, respectively. The specific hierarchical layer associated with the network interface may be identified by, for example, determining whether one or multiple functions performed by the network device are consistent with a particular hierarchical layer.

For the example implementation that is depicted in FIG. 3, block 340 demarcates the end of the second phase of the iteration and the beginning of the third phase. In the third phase, as depicted in block 340, the process 300 marks the network interface as being a likely uplink, determines a probability for the uplink candidate and updates the ranking of the probabilities that have been determined so far in the process 300. In accordance with some implementations, the process 300 may determine the probability that the uplink candidate is an actual uplink based on the candidate's score. In an example, the probability may be determined based on the ratio of the score to the maximum value for the score. In another example, the probability may be determined based on the score and a statistic (e.g., a variance or standard deviation) of the scores derived from the same L2 or L3 criteria. In another example, the score may be categorized as belong to one of multiple score ranges, and different probabilities may be assigned to the ranges.

Regardless of how the probability is determined, if the probability is in the top M probabilities determined so far (as determined in decision block 342), the process 300 updates (block 344) the corresponding top M list of network interfaces to designate the network interface as being a likely uplink. It is noted that a particular network interface of the top M list may be removed from the top M list in a subsequent iteration of the process 300 due to the probability of the network interface no longer being in the top M probabilities. The third phase of the iteration ends, and control transfers to decision block 304 for a determination of whether there is another network interface to process.

Figure 4:
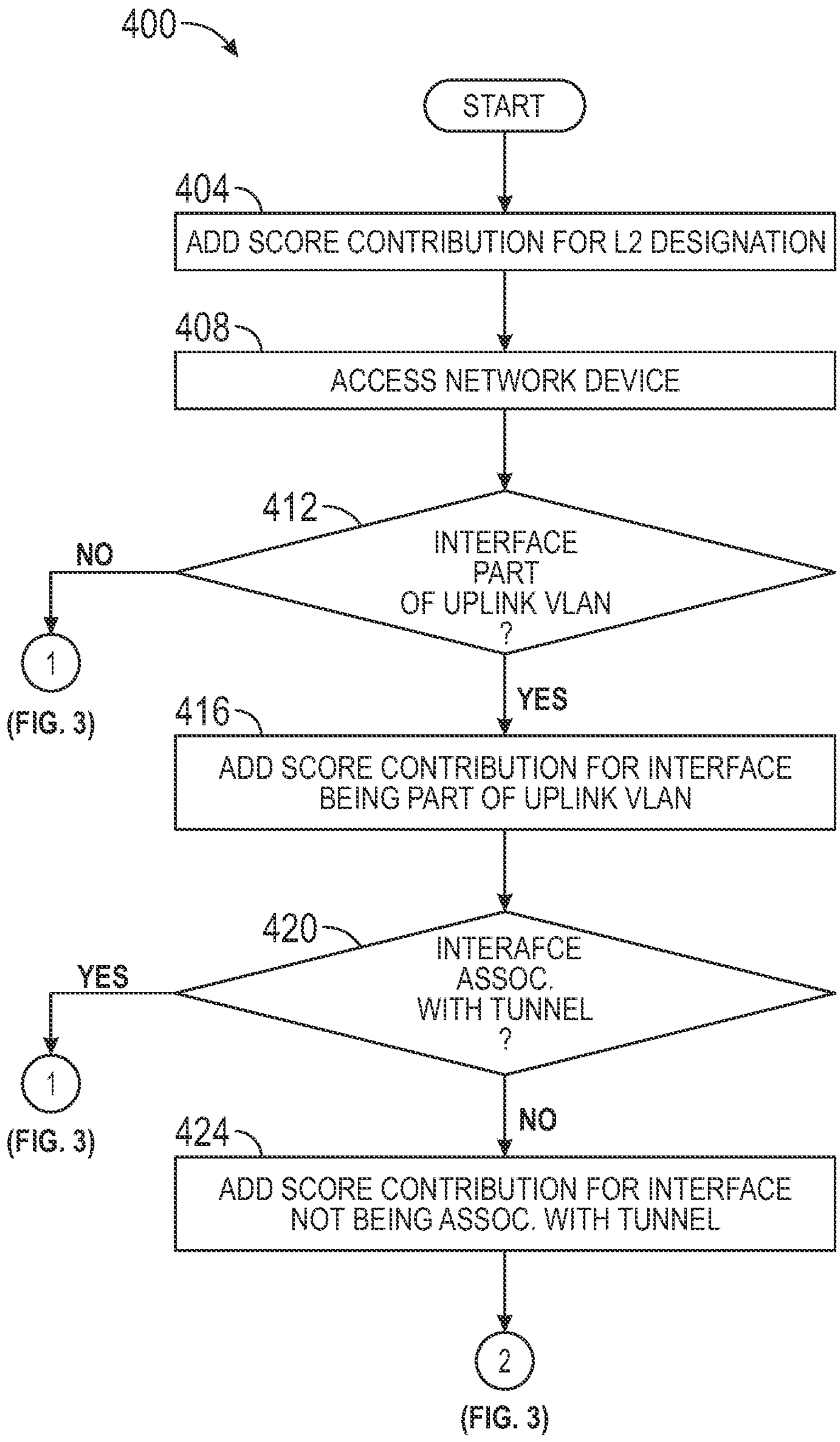
FIG. 4 is a flow diagram depicting a process to apply layer two (L2) criteria to evaluate an uplink candidate according to an example implementation.

FIG. 4 is a process 400 to apply L2 criteria to a network interface that has been identified as an L2 interface. In general, the process 400 determines, based on the L2 criteria, whether certain contributions should be added to the score, and the process 400 further determines, based on the L2 criteria, whether the network interface should be removed from the pool of uplink candidates. In an example, the process 400 may be performed by an uplink identification engine, such as the uplink identification engine 180 of FIG. 1 or the uplink identification engine 240 of FIG. 2.

Referring to FIG. 4, in accordance with example implementations, the score for the network interface may be initialized to a predetermined value (e.g., zero). The process 400 includes adding a contribution to the score for the interface being an L2 interface, as depicted at block 404. Next, in accordance with example implementations, the process 400 includes accessing (block 408) the network device for purposes of acquiring data representing one or multiple network interface attributes that are evaluated by the L2 criteria. In an example, a background, or daemon, program may execute on the network device for purposes of allowing an authorized requestor, such as the uplink identification engine, to log into the network device. In an example, the daemon program may be a secure shell daemon (SSHd) server (e.g., an SSHd server installed as part of a LINUX operating system) that communicates, via an SSH protocol, with an SSH client that is associated with the uplink identification engine. In an example the SSH protocol may be SSH, version 2 (SSHv2). In accordance with further implementations, the process 400 may access one or multiple attributes evaluated by the L2 criteria from configuration data (e.g., the configuration data 185 of FIG. 1 or the configuration data 270 of FIG. 2) that is stored and maintained by the NMS central resources.

Pursuant to decision block 412, the process 400 includes determining whether the network interface is part of an uplink VLAN. If not, then, in accordance with example implementations, control transitions to block 312 of FIG. 3 to mark the interface as not being an uplink. Otherwise, the process 400 includes adding a contribution to the score corresponding to the network interface being part of an uplink VLAN, as depicted at 416.

In accordance with some implementations, the process 400 considers a network interface to not be an uplink if the network interface is associated with a tunnel. In this context, a "tunnel" refers to an encapsulation protocol in which a protocol used to communicate a unit of data (e.g., a packet) is encapsulated into an outer protocol. As depicted in FIG. 4, if, pursuant to decision block 420, the network interface is determined to be associated with a tunnel, then control proceeds to block 312 (FIG. 3) to mark the interface as not being an uplink. Otherwise, pursuant to block 424, the process 400 adds a contribution to the score for the network interface not being associated with a tunnel, and control proceeds to block 340 of FIG. 3.

In accordance with further implementations, the L2 criteria may include additional and/or different criteria than what is depicted in FIG. 4. For example, in accordance with further implementations, the process 400 may include determining whether the uplink VLAN configuration is a default configuration or a non-default configuration. In an example, the process may assign one score contribution (e.g., a relatively smaller contribution) for the uplink VLAN configuration being a default configuration and assign another score contribution (e.g., a relatively larger contribution) for the uplink VLAN configuration being a non-default configuration.

Figure 5:
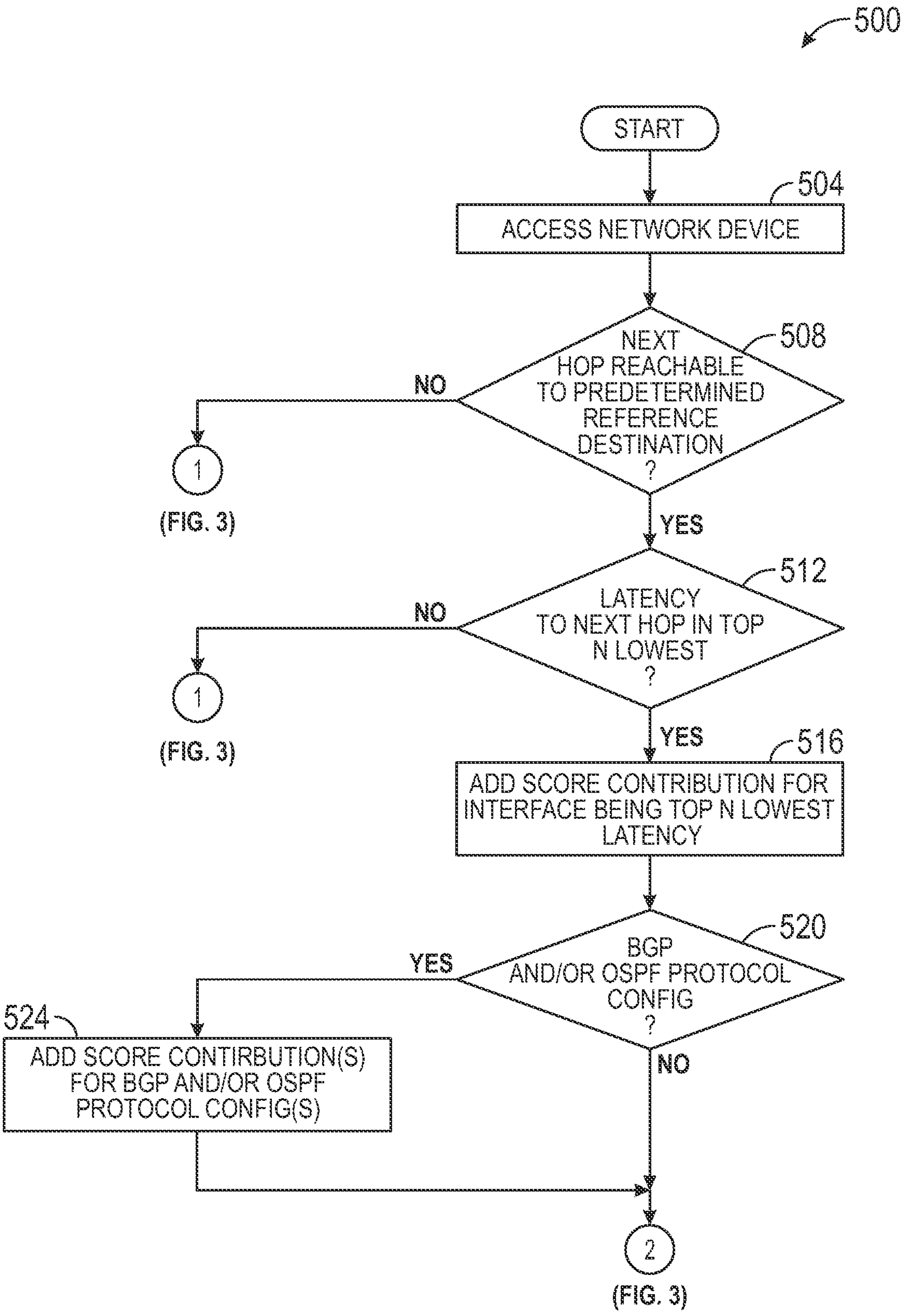
FIG. 5 is a flow diagram depicting a process to apply layer three (L3) criteria to evaluate an uplink candidate according to an example implementation.

FIG. 5 is a process 500 to apply L3 criteria to a network interface that has been identified as an L3 interface. In general, the process 500 determines, based on the L3 criteria, whether certain contributions should be added to the score, and the process 300 further determines, based on the L3 criteria, whether the network interface should be removed from the pool of uplink candidates. In an example, the process 300 may be performed by an uplink identification engine, such as the uplink identification engine 180 of FIG. 1 or the uplink identification engine 240 of FIG. 2.

Referring to FIG. 5, the process 500 includes accessing (block 504) the network device. In an example, the accessing may include an SSH client of the uplink identification engine communicating with an SSHd daemon server of the network device, as described above in connection with FIG. 4. Using this access, the process 500 includes determining, pursuant to decision block 508, whether a predetermined reference destination can be reached from the next hop from the network interface. In this context, the "next hop" refers to the next network device encountered by packets in the path from the network interface to the predetermined reference destination. The "predetermined reference destination" refers to a publicly-accessible network device or group of network devices associated with a certain IP address (or domain name corresponding to the IP address). In an example, the predetermined reference destination may correspond to a public domain name service (DNS) server. In another example, the predetermined reference destination may correspond to a time server or a cluster of time servers (e.g., the time server cluster corresponding to the domain pool.ntp.org). If, pursuant to decision block 508, the process 500 determines that the predetermined reference destination cannot be reached from the next hop, then control proceeds to block 312 (FIG. 3) to mark the network interface as not being an uplink.

If, pursuant to decision block 508, the process determines that the predetermined reference destination can be reached from the next hop, then, pursuant to decision block 512, the process 500 determines whether the latency to the next hop in the top N lowest latencies for all of the L3 network interface latencies processed so far. Here, "N" may be an integer that is equal to or greater than one. In accordance with example implementations, if the latency to the next hop is in the top N lowest latencies, then the process 500 includes adding a contribution to the score, as depicted at block 516. Otherwise, the control proceeds to block 312 (FIG. 3) to mark the network interfaces as not being an uplink.

In accordance with some implementations, decision blocks 508 and 512 may include sending a trace route probe to the predetermined reference destination. In an example, the network device may have a LINUX operating system, and sending a trace route probe may include the uplink identification engine remotely executing a LINUX traceroute command on the network device, with the predetermined reference destination being the destination for the command. Responsive to the traceroute command being executed, the LINUX operating system returns response times (e.g., three response times) for each hop along the path to respond to respective echo, or ping packets. Determining whether the next hop can reach the predetermined reference destination, pursuant to decision block 508, may include the uplink identification engine determining whether the traceroute command execution reached the predetermined reference destination from the next hop. In an example, determining the latency to the next hop includes the uplink identification engine averaging the response times for the next hop to respond to the ping packets. In another example, determining the latency to the next hop includes the uplink identification engine selecting a particular response time (e.g., the first response time) for the next hop. In another example, for a network device having a WINDOWS operating system, determining whether the next hop can reach the predetermined reference destination and determining the latency of the next hop may include remotely executing a tracert command on the network device.

The process 500 may include evaluating one or multiple other criteria for purposes of determining score contributions for the network interface. In an example, as depicted in decision block 520, the process 500 may include determining whether the network interface is configured for a particular routing protocol. In an example, pursuant to decision block 520, the process 500 may include determining whether the network interface is configured for one or multiple specific routing protocols, such as a border gateway protocol (BGP) and/or an Open Shortest Path First (OSPF) protocol. As depicted in block 524, the process 500 includes adding score contribution(s) for the corresponding protocol (s). The uplink identification engine may determine the specific routing protocol(s) for a network interface in any of a number of different ways, such as by accessing the network device to acquire configuration settings of the network device and/or acquiring this information from configuration data (e.g., the configuration data 185 of FIG. 1 or the configuration data 270 of FIG. 2) that is stored and maintained by the NMS central resources.

FIG. 6 depicts an example uplink scorecard 600, a table of columns and rows, for five example network interfaces for purposes of illustrating the derivation of scores by an uplink identification engine, in accordance with example implementations. Columns 606, 608, 610, 614, 618 and 622 of the scorecard 600 are depicted in partial view FIG. 6A, and columns 624, 628, 632, 633, 634 and 636 are depicted in partial view FIG. 6B. In examples, the uplink identification engine may be the uplink identification engine 180 of FIG. 1 or the uplink identification engine 240 of FIG. 2. Referring to FIGS. 6A and 6B, each row 640 of the scorecard 600 corresponds to a different network interface and has a corresponding score in a total score column 636 of the scorecard 600. As depicted in column 606 of the scorecard 600, each network interface has a corresponding name in the format of <Network Device ID>/<Interface Module ID>/<Interface ID>. For example, as depicted in row 640-1, network interface 1/1/1 corresponds to network device "1," interface module "1" and interface "1." Row 640-4 corresponds to interface "4" from the same network device and same interface module.

The YES or NO values in column 608 of the scorecard 600 indicates whether or not each network interface is configured for routing, and the values in column 632 of the scorecard 600 indicates whether each network interface is an L2 or an L3 interface. Therefore, in examples, the network interface 1/1/1 corresponding to row 640-1 of the scorecard 600 is an L3 interface that is configured for routing, and the network interface 1/1/4 corresponding to row 640-4 of the scorecard 600 is an L2 interface. The L2 or L3 classification of the network interface is depicted in column 632.

The YES or NO values in column 610 of the scorecard indicates whether or not each network interface is configured for the BGP. The YES or NO values in column 610 indicates whether or not each network interface is configured for OSPF routing. Therefore, in an example, network interface 1/1/1 is configured for both the BGP and OSPF routing.

The scorecard 600 also includes columns that represent whether or not each network interface is configured for a gateway (column 622) and whether or not each network interface has a default configuration (column 628). Additionally, the scorecard 600 includes a column 614 that contains values that indicate whether each of the L2 interfaces, such as the network interfaces 1/1/2, 1/1/4 and 1/15, has a default VLAN or a non-default VLAN. The scorecard 600 has a column 624 that contains values that indicate the hierarchical layer (e.g., access layer, distribution layer or core layer) associated with the network interface. Moreover, the scorecard 600 may also have columns that represent whether or not each network interface is associated with a tunnel (column 633) and whether or not each network interface is associated with a top N latency (column 634).

In an example, the score contributions may be as follows. If the network interface is an L2 interface (as depicted in column 632), then the uplink identification engine adds a contribution of "20" to the score. If the network interface is an L3 interface and configured for BGP routing (as depicted in column 610), then the uplink identification engine adds a contribution of "30" to the score. If the network interface is an L3 interface and configured for OSPF routing (as depicted in column 618), then the uplink identification engine adds a contribution of "30" to the score. If the network interface is an L2 interface and has a default VLAN configuration (as depicted in column 614), then the uplink identification engine adds a contribution of "10" to the score. If the network interface is an L2 interface and has a non-default VLAN configuration (as depicted in column 614), then the uplink identification engine adds a contribution of "30" to the score. If the network interface is an L3 interface and has a gateway configuration (as depicted in column 622), then the uplink identification engine adds a contribution of "20" to the score. The uplink identification engine adds a contribution of "30," "40" or "60" to the score depending on whether the network interface is associated with an access layer, a distribution layer or a core layer, respectively (as depicted in column 624). The uplink identification engine adds a contribution of "20" to the score for the network interface having a non-default configuration (as depicted in column 628). The uplink identification engine adds a contribution of "20" to the score for an L2 network interface not being associated with a tunnel (as depicted in column 633). The uplink identification engine adds a contribution of "20" to the score for an L3 network interface having a top N latency (as depicted in column 634).

In an example, the uplink identification engine may determine a score for the interface 1/1/1, which corresponds to row 640-1 of the scorecard 600, as follows. The interface 1/1/1 is an L3 interface. The uplink identification engine adds a score contribution of "30" for the interface 1/1/1 having a BGP routing configuration. The uplink identification engine adds a score contribution of "30" for the interface 1/1/1 having an OSPF routing configuration. The uplink identification engine adds a score contribution of "20" for the interface 1/1/1 having a gateway configuration and adds a score of "30" for the interface 1/1/1 being associated with the access layer. The uplink identification engine adds a score of "30" for the interface 1/1/1 having a non-default configuration. Finally, the uplink identification adds a score contribution of "20" for the interface 1/1/1 having a top N latency. The uplink identification engine adds these contributions together to derive a total score of "160" for the interface 1/1/1, as depicted in column 636.

In another example, the uplink identification engine may determine a score for the interface 1/1/4, which corresponds to row 640-4 of the scorecard 600, as follows. The interface 1/1/4 is an L2 interface. The uplink identification engine adds a score contribution of "20" for the interface 1/1/4 being an L2 interface. The uplink identification engine adds a score contribution of "30" for the interface 1/1/4 having a non-default VLAN configuration. The uplink identification engine adds a score contribution of "20" for the interface 1/1/4 having a gateway configuration and adds a score of "30" for the interface 1/1/4 being associated with the access layer. The uplink identification engine adds a score of "30" for the interface 1/1/4 having a non-default configuration. Finally, the uplink identification adds a score contribution of "20" for the interface 1/1/4 not being associated with a tunnel. The uplink identification engine adds these contributions together to derive a total score of "150" for the interface 1/1/4, as depicted in column 636.

The scorecard 600 and the corresponding score contributions are merely an example of one of many different score categories and score contributions that may be used by an uplink identification engine to score uplink candidates. The uplink identification may use other score categories and/or other score contributions in accordance with further implementations.

Figure 7:
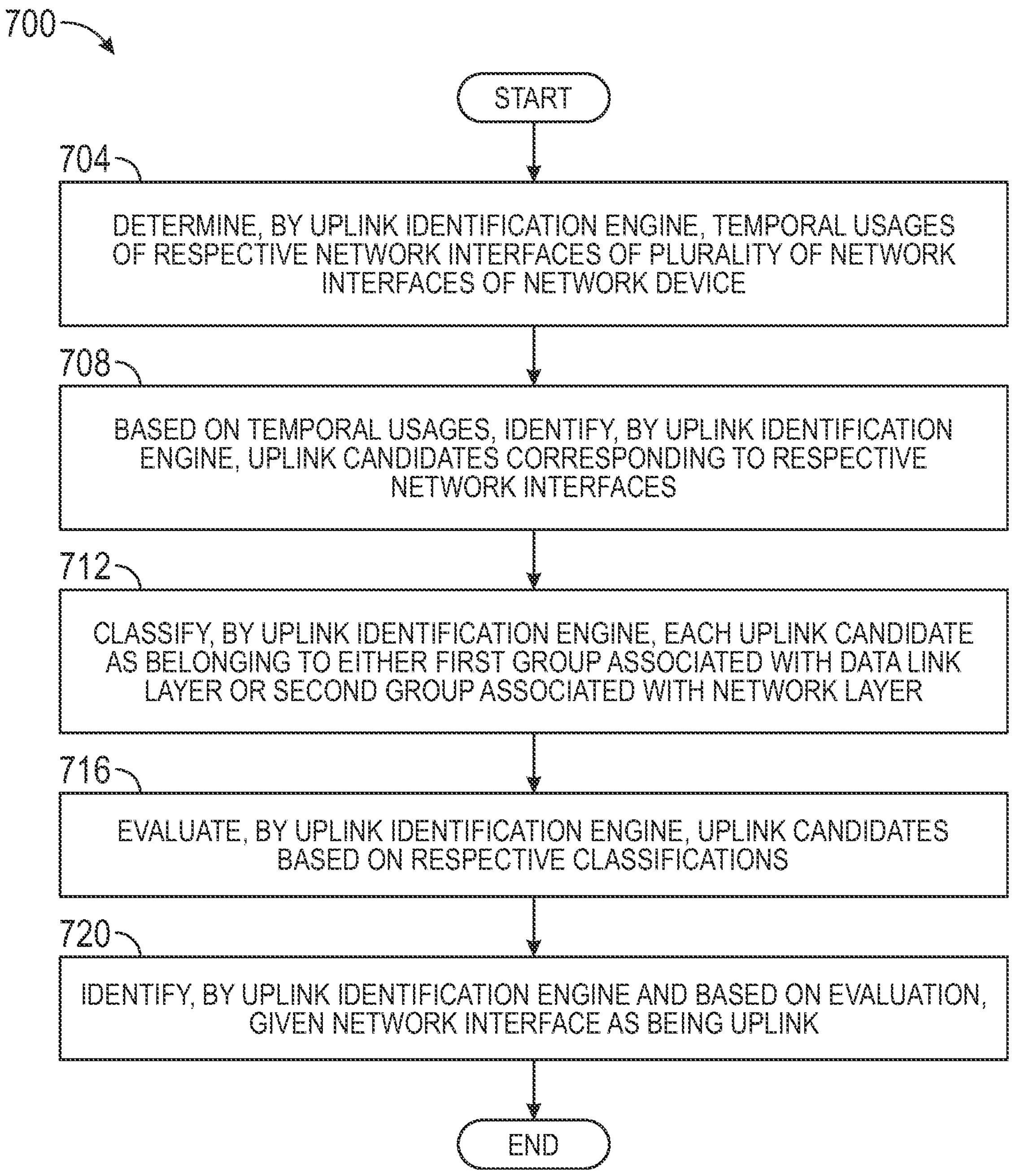
FIG. 7 is a flow diagram depicting a process to identify an uplink of a network device according to an example implementation.

Referring to FIG. 7, in accordance with example implementations, a process 700 includes determining (704), by an uplink identification engine, temporal usages of respective network interfaces of a plurality of network interfaces of a network device. In an example, the uplink identification engine may be part of an NMS. In an example, the uplink identification engine may be provided by central resources of an NMS. In an example, the uplink identification engine may correspond to machine-readable instructions that are executed by a hardware processor. In an example, the uplink identification engine may correspond to a dedicated hardware circuit that does not execute machine-readable instructions. In an example, the uplink identification may be a combination of a circuit that executes machine-readable instructions and a dedicated hardware circuit that does not execute machine-readable instructions.

In an example, determining the temporal usages may include determining link states associated with the network interfaces. In an example, determining the temporal usages may include, for a given network interface, determining whether the network interface had a link up state during a contiguous observation time period. In an example, the observation time period may include business and non-business hours. In examples, the observation time period may span more than twenty-four hours for a weekday, more than seventy-two hours for a weekend or a time period that includes hours in and outside of a holiday.

The process 700 includes, based on the temporal usages, identifying, by the uplink identification engine, a plurality of uplink candidates corresponding to respective network interfaces of the plurality of network devices. In an example, identifying the plurality of uplink candidates may include, for a given network interface, determining that the network interface is an uplink candidate responsive to the network interface having at least a single instance of an associated link up state during a contiguous observation time period. In an example, identifying the plurality of uplink candidates includes applying elimination criteria to the network interfaces. In an example, applying the elimination criteria includes eliminating a network interface from uplink consideration responsive to determining that the network interface is a PoE-enabled interface.

Pursuant to block 712, the process 700 includes classifying, by the uplink identification engine, each uplink candidate as belonging to either a first group that is associated with a data link layer or a second group that is associated with a network layer. In an example, the data link layer may be layer two of the OSI model. In an example, the network layer by may layer three of the OSI model.

Pursuant to block 716, the process 700 includes evaluating, by an uplink identification engine, the plurality of uplink candidates based on the respective classifications. In an example, evaluating the plurality of uplink candidates includes determine scores for respective uplink candidates. In an example, evaluating the plurality of uplink candidates includes, for a given network interface, determining applying L2 criteria based on a determination that the network interface is an L2 interface. In an example, applying the L2 criteria includes removing the network interface from uplink consideration based on the L2 criteria. In an example, applying the L2 criteria includes determining a score for the network interface based on the L2 criteria. In an example, evaluating the plurality of uplink candidates includes, for a given network interface, determining applying L3 criteria based on a determination that the network interface is an L3 interface. In an example, applying the L3 criteria includes removing the network interface from uplink consideration based on the L3 criteria. In an example, applying the L3 criteria includes determining a score for the network interface based on the L3 criteria.

In an example, determining a score for a network interface based on the L2 criteria includes determining a contribution for the score based on the network interface being an L2 interface. In an example, determining a score for a network interface based on the L2 criteria includes determining a contribution for the score based on the network interface being an uplink VLAN. In an example, determining a score for a network interface based on the L2 criteria includes determining a contribution for the score based on the network interface having a default VLAN configuration. In an example, determining a score for a network interface based on the L2 criteria includes determining a contribution for the score based on the network interface having a non-default VLAN configuration. In an example, determining a score for a network interface based on the L2 criteria includes determining a contribution for the score based on the network interface not being associated with a tunnel.

In an example, determining a score for a network interface based on the L3 criteria includes determining a contribution for the score based on the network interface being an L3 interface. In an example, determining a score for a network interface based on the L3 criteria includes determining a contribution for the score based on the network interface having a next hop latency that is in the top N next hop latencies. In an example, determining a score for a network interface based on the L3 criteria includes determining a contribution for the score based on the network interface having a BGP routing configuration. In an example, determining a score for a network interface based on the L3 criteria includes determining a contribution for the score based on the network interface having a OSPF routing configuration.

Pursuant to block 720, the process 700 includes identifying, by the uplink identification engine and based on the evaluation, a given network interface as being an uplink. In an example, identifying the given network interface includes determining a likelihood of the given network interface being an uplink. In an example, the likelihood is determined based on a score determined for the given network interface. In an example, a likelihood for each uplink candidate is determined, and the uplink candidates having the top M likelihoods are identified. In an example, the given network interface corresponds to an uplink candidate having one of the top M likelihoods.

Figure 8:
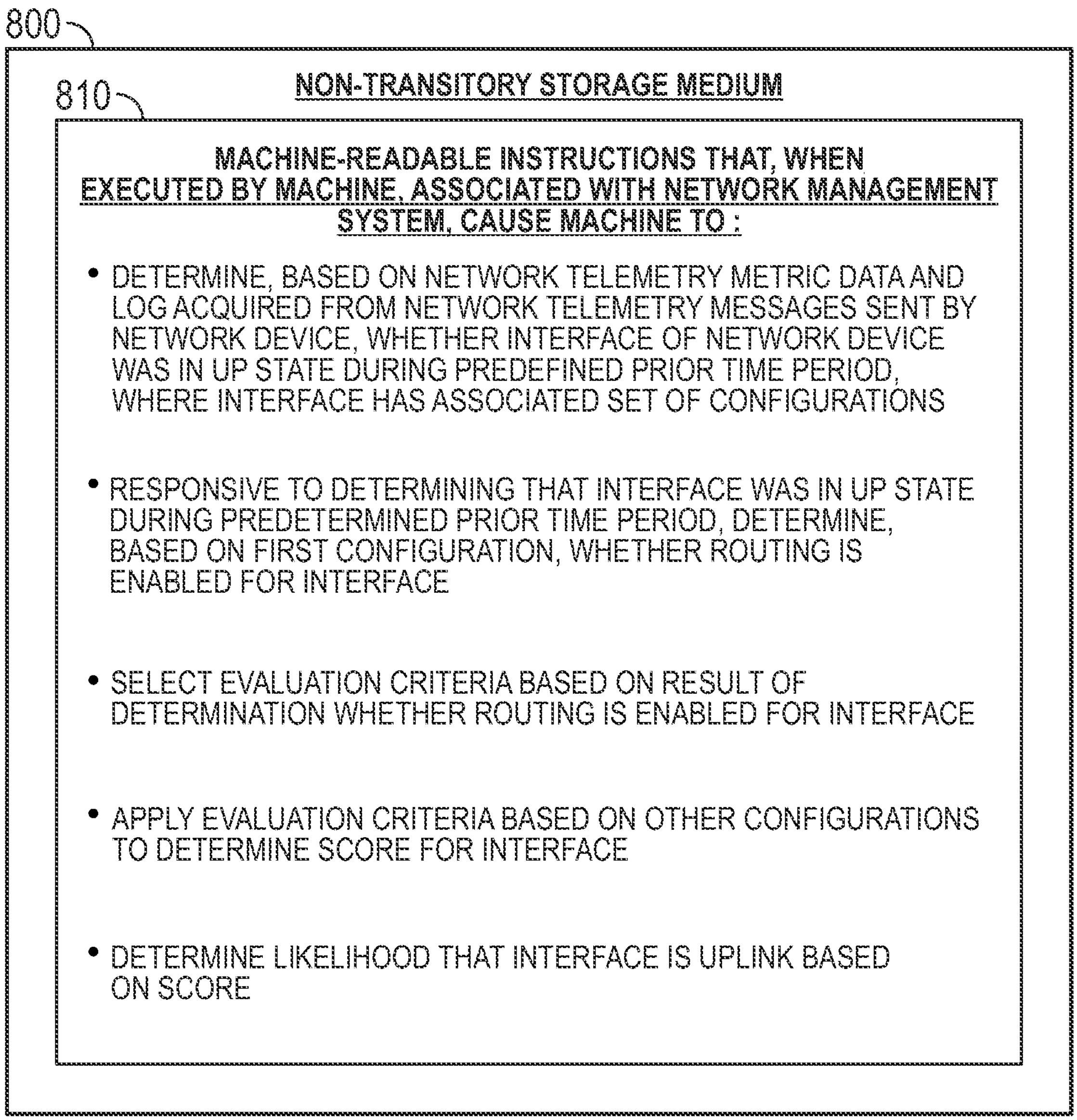
FIG. 8 is an illustration of machine-readable instructions that, when executed by a machine associated with a network management service, cause the machine to determine a likelihood of a network interface being an uplink according to an example implementation.

Referring to FIG. 8, in accordance with example implementations, a non-transitory storage medium 800 stores machine-readable instructions 810. The instructions 810, when executed by a machine that is associated with a network management service, cause the machine to determine, based on network telemetry metric data and a log acquired from network telemetry messages sent by a network device, whether an interface of the network device was in an up state during a predefined prior time period. The interface has an associated set of configurations. In an example, network telemetry data may represent that a current link down state for the network interface. The log may be a log of link states for the network interface spanning the prior time period. The log may, for example, may contain data representing a link up state during the prior time period. In an example, the predefined prior time period may be a contiguous observation time period. In an example, the observation time period may include business and non-business hours. In examples, the observation time period may span more than twenty-four hours for a weekday, more than seventy-two hours for a weekend or a time period spanning hours inside of and out of a holiday.

The instructions 810, when executed by the machine, further cause the machine to, responsive to determining that the interface was in the up state during the predetermined time period, determine, based on a first configuration, whether routing is enabled for the interface. In an example, determining whether routing is enabled for the interface may include determining whether the interface is an L3 interface.

The instructions 810, when executed by the machine, further cause the machine to select evaluation criteria based on a result of the determination of whether routing is enabled for the interface.

In an example, selecting the additional selection criteria may include selecting the criteria to evaluate a next hop latency of the network interface. In an example, the selected evaluation criteria may consider whether the network interface is configured for a BGP routing protocol. In an example, the selected evaluation criteria may consider whether the network interface is configured for an OSPF routing protocol. In an example, selecting the evaluation criteria includes selecting evaluation criteria that considers a next hop latency associated with the interface. In an example, selecting the evaluation criteria includes selecting evaluation criteria that considers whether the interface is associated with a BGP routing protocol. In an example, selecting the evaluation criteria includes selecting criteria that considers whether the interface is associated with an OSPF routing protocol.

The instructions 810, when executed by the machine, further cause the machine to apply the evaluation criteria based on the other configurations to determine a score for the interface. In an example, determining the score may include determining a score contribution for the interface having a top N lowest latency to the next hop. In an example, determining the score may include determining a score contribution for the interface being associated with a BGP routing protocol. In an example, determining the score may include determining a score contribution for the interface being associated with an OSPF routing protocol configuration. In an example, determining the score may include determining a score contribution based on whether the network is associated with a gateway configuration.

The instructions 810, when executed by the machine, further cause the machine to determine a likelihood that the interface is an uplink based on the score. In accordance with example implementations, the instructions may cause the machine to rank the likelihood against other likelihoods of interfaces for the network device, and determine whether the interface is a likely uplink based on this ranking.

Figure 9:
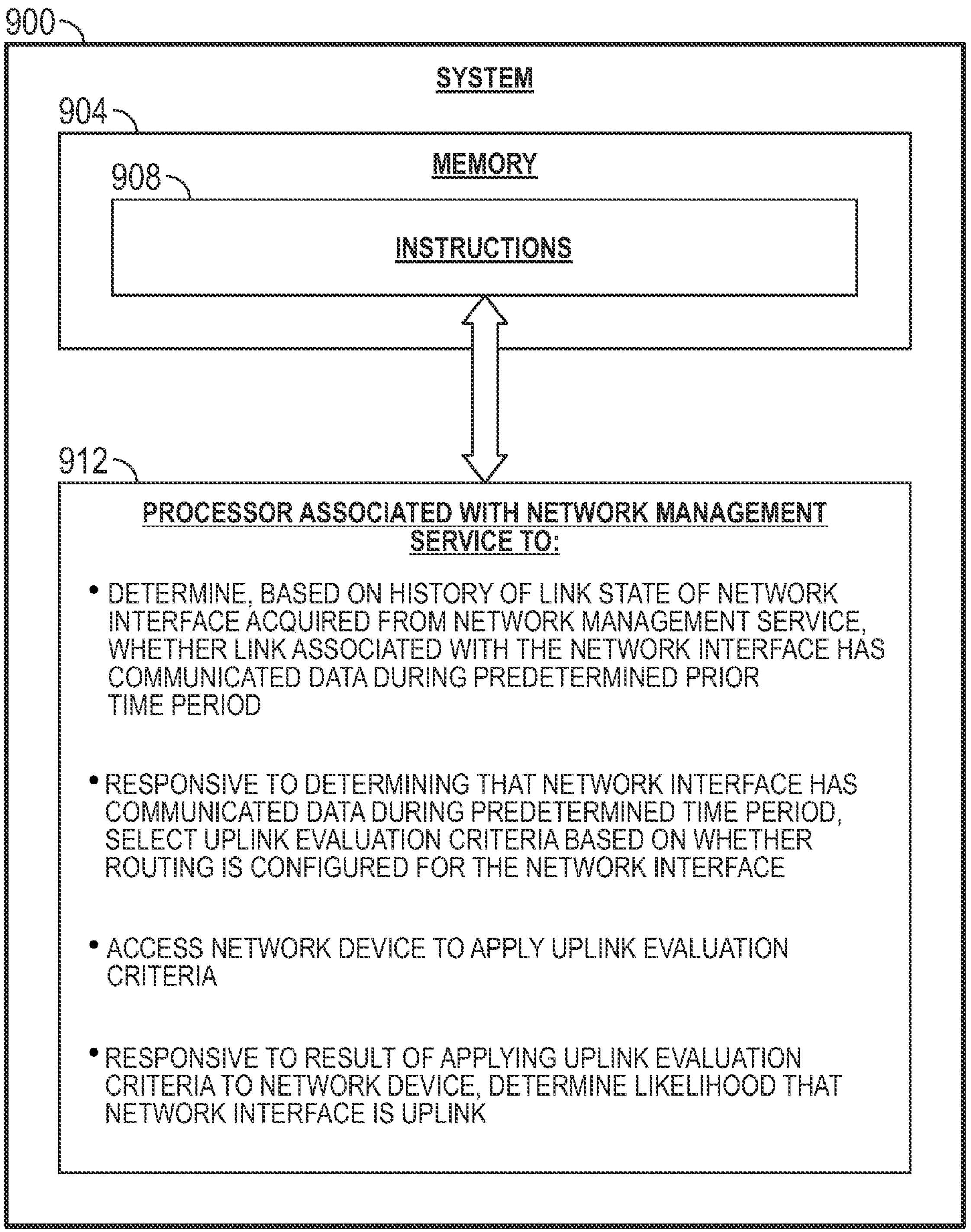
FIG. 9 is a block diagram of a system that includes a hardware processor associated with a network management service to determine a likelihood of a network interface being an uplink according to an example implementation.

Referring to FIG. 9, in accordance with example implementations, a system 900 includes a hardware processor 912 that is associated with a network management service and a memory 904. The memory 904 stores machine-readable instructions 808 that, when executed by the hardware processor 912, cause the hardware processor 912 to, determine, based on a history of a link state of the network interface acquired from the network management service, whether a link that is associated with the network interface has communicated data during a predetermined prior time period. In an example, determining whether the link is associated with the network interface as communicated data during a predetermined prior time period includes examining a history of the link state over business and non-business hours. In an example, examining the history of the link state may include observing the link state over an observation time period that spans more than twenty-four hours for a weekend, more than seventy-two hours for a weekend or a time span that includes hours in and outside of a holiday.

The instructions 908, when executed by the hardware processor 912, further cause the hardware processor 912 to, responsive to determining that the network interface has communicated data during the predetermined time period, select uplink evaluation criteria based on whether routing is configured for the network interface.

The instructions 908, when executed by the hardware processor 912, further cause the hardware processor 912 to access the network device to apply uplink evaluation criteria. The instructions 908, when executed by the hardware processor 912, further cause the hardware processor 912 to, responsive to a result of applying the uplink evaluation criteria to the network device, determine a likelihood that the network interface is an uplink.

In accordance with example implementations, evaluating the plurality of uplink candidates includes determining a score for each uplink candidate. Determining the scores includes selecting scoring criteria for each uplink candidate based on whether the uplink candidate belongs to the first group or the second group. Among the advantages, uplinks for a network device may be accurately and efficiently identified.

In accordance with example implementations, classifying a given uplink candidate corresponding to the given network interface includes determining that the given uplink candidate belongs to the first group. Determining the score for the given uplink candidate includes determining a contribution to the score for the given uplink candidate based on whether the given network interface is part of an uplink virtual area network (VLAN). Among the advantages, uplinks for a network device may be accurately and efficiently identified.

In accordance with example implementations, classifying a given uplink candidate corresponding to the given network interface includes determining that the given uplink candidate belongs to the first group. Determining the score for the given uplink candidate includes determining a contribution to the score based on whether the given network interface is associated with a tunnel. Among the advantages, uplinks for a network device may be accurately and efficiently identified.

In accordance with example implementations, the uplink candidates are associated with respective latencies. Classifying a given uplink candidate corresponding to the given network interface includes determining that the given uplink candidate belongs to the second group. Determining the score for the given uplink candidate includes determining a contribution to the score for the given uplink candidate based on a ranking of the latency associated with the given uplink candidate against the remaining latencies. Among the advantages, uplinks for a network device may be accurately and efficiently identified.

In accordance with example implementations, determining the score for the given uplink candidate further includes determining the contribution based on whether the latency associated with the given uplink candidate is within a lowest predetermined number of latencies. Among the advantages, uplinks for a network device may be accurately and efficiently identified.

In accordance with example implementations, evaluating the plurality of uplink candidates further includes selecting a group of uplink candidates likely to be uplinks. The group of likely uplink candidates includes the given uplink candidate. Among the advantages, uplinks for a network device may be accurately and efficiently identified.

In accordance with example implementations, uplink probabilities for respective uplink candidates are determined by the uplink identification engine. A usage of the given network interface is compared to the threshold, and an alert is selectively generated based on a result of the comparison. Among the advantages, uplinks for a network device may be accurately and efficiently identified.

In accordance with example implementations, sending, by the uplink identification engine and to an administrative graphical user interface, data representing identification of the given network interface as an uplink. Among the advantages, uplinks for a network device may be accurately and efficiently identified.

The detailed description set forth herein refers to the accompanying drawings. Wherever possible, the same reference numbers are used in the drawings and the foregoing description to refer to the same or similar parts. It is to be expressly understood, however, that the drawings are for the purpose of illustration and description only. While several examples are described in this document, modifications, adaptations, and other implementations are possible. Accordingly, the detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:

receiving, by a central server, network telemetry metrics provided by a network device and logging, by the central server, the network telemetry metrics;

responsive to the logging, applying, by an uplink identification engine of the central server, a time series analysis to link states indicated by the network telemetry metrics to determine temporal usages of respective network interfaces of a plurality of network interfaces of the network device;

based on the temporal usages, identifying, by the uplink identification engine, a plurality of uplink candidates corresponding to respective network interfaces of the plurality of network devices;

classifying, by the uplink identification engine, each uplink candidate of the plurality of uplink candidates as belonging to either a first group associated with a data link layer or a second group associated with a network layer;

evaluating, by the uplink identification engine, the plurality of uplink candidates based on the classifying, wherein the evaluating comprises accessing, by the uplink identification engine, the network device; and identifying, by the uplink identification engine and based on the evaluation, a given network interface of the plurality of network interfaces as being an uplink.

2. The method of claim 1, wherein:

evaluating the plurality of uplink candidates further comprises determining a score for each uplink candidate of the plurality of uplink candidates; and determining the scores comprises selecting scoring criteria for each uplink candidate of the plurality of uplink candidates based on whether the uplink candidate belongs to the first group or the second group.

3. The method of claim 2, wherein:

classifying a given uplink candidate of the plurality of uplink candidates corresponding to the given network interface comprises determining that the given uplink candidate belongs to the first group; and determining the score for the given uplink candidate comprises determining a contribution to the score for the given uplink candidate based on whether the given network interface is part of an uplink virtual area network (VLAN).

4. The method of claim 2, wherein:

classifying a given uplink candidate of the plurality of uplink candidates corresponding to the given network interface comprises determining that the given uplink candidate belongs to the first group; and determining the score for the given uplink candidate comprises determining a contribution to the score for the given uplink candidate based on whether the given network interface is associated with a tunnel.

5. The method of claim 2, wherein:

the uplink candidates of the plurality of uplink candidates are associated with respective latencies of a plurality latencies;

classifying a given uplink candidate of the plurality of uplink candidates corresponding to the given network interface comprises determining that the given uplink candidate belongs to the second group; and determining the score for the given uplink candidate comprises determining a contribution to the score for the given uplink candidate based on a ranking of the latency associated with the given uplink candidate against the remaining latencies of the plurality of latencies.

6. The method of claim 5, wherein determining the score for the given uplink candidate further comprises determining the contribution based on whether the latency associated with the given uplink candidate is within a lowest predetermined number of latencies of the plurality of latencies.

7. The method of claim 1, wherein:

evaluating the plurality of uplink candidates further comprises selecting a group of uplink candidates of the plurality of candidates likely to be uplinks; and the group of likely uplink candidates includes the given uplink candidate.

8. The method of claim 7, further comprising:

determining, by the uplink identification engine, uplink probabilities for respective uplink candidates of the group of uplink candidates.

9. The method of claim 1, further comprising:

responsive to the identification, setting a usage threshold for the given network interface;

comparing a usage of the given network interface to the threshold; and selectively generating an alert based on a result of the comparison.

10. The method of claim 1, further comprising:

sending, by the uplink identification engine and to an administrative graphical user interface, data representing identification of the given network interface as an uplink.

11. The method of claim 1, wherein the classifying comprising classifying, by the uplink identification engine, a given uplink candidate of the plurality of uplink candidates as belonging to the second group; and the evaluating comprises:

accessing, by the uplink identification engine, the network device, to determine a latency associated with a next hop of a routing path between the given uplink candidate and a predetermined destination;

ranking, by the uplink identification engine, the latency relative to latencies determined for other uplink candidates of the plurality of uplink candidates; and determining a score for the given uplink candidate, wherein determining the score comprises determining a contribution to the score based on the ranking.

12. The method of claim 1, further comprising:

causing, by the uplink identification engine, the network device to execute a traceroute command to send, from the given uplink candidate, a traceroute probe from the given uplink candidate and receive, by the given uplink candidate, a result of the traceroute probe; and determining the latency based on the result.

* * * * *